United States Patent [19]

Naitoh et al.

[11] Patent Number: 4,794,483
[45] Date of Patent: Dec. 27, 1988

[54] MAGNETIC HEAD HAVING LAYERS OF AMORPHOUS MAGNETIC ALLOY BONDED TOGETHER WITH A GLASS CONTAINING VANDIUM OXIDE PHOSPHORUS OXIDE AND ANTIMONY OXIDE

[75] Inventors: Takashi Naitoh; Takashi Namekawa, both of Hitachi; Seiichi Yamada, Ibaraki; Satoru Ogihara, Hitachi; Juichi Morikawa, Katsuta, all of Japan

[73] Assignee: Hitachi, Ltd., Tokyo, Japan

[21] Appl. No.: 918,339

[22] Filed: Oct. 14, 1986

[30] Foreign Application Priority Data

Oct. 14, 1985 [JP] Japan ................. 60-226786

[51] Int. Cl.⁴ .................................. G11B 5/235
[52] U.S. Cl. ................... 360/120; 360/125
[58] Field of Search ............ 360/125, 120, 119, 110, 360/127, 123; 501/45, 46

[56] References Cited

U.S. PATENT DOCUMENTS

| | | | |
|---|---|---|---|
| 3,520,831 | 7/1970 | Hendrikus | 252/518 |
| 4,060,422 | 11/1977 | Asahara | 501/46 |
| 4,229,220 | 10/1980 | Hirota | 501/46 |
| 4,342,943 | 8/1982 | Weaver | 313/479 |

FOREIGN PATENT DOCUMENTS

| | | |
|---|---|---|
| 0138580 | 4/1985 | European Pat. Off. . |
| 0195411 | 9/1986 | European Pat. Off. . |
| 2403615 | 4/1979 | France . |
| 2576702 | 1/1986 | France . |
| 0146431 | 8/1984 | Japan . |
| 0170008 | 9/1985 | Japan .................. 360/119 |
| 0005406 | 1/1986 | Japan . |
| 0781917 | 12/1980 | U.S.S.R. ................ 360/120 |

Primary Examiner—A. J. Heinz
Assistant Examiner—Andrew L. Sniezek
Attorney, Agent, or Firm—Antonelli, Terry & Wands

[57] ABSTRACT

A magnetic head has a layer of amorphous magnetic alloy arranged to define a magnetic gap therebetween, the layer being bonded with a bonding glass having a viscosity of $10^5$ poises or less at a temperature by at least 50° C. lower than the crystallization temperature of the amorphous magnetic alloy, a good water resistance after sintering and a low coefficient of thermal expansion such as $100 \times 10^{-7}/°C$. or less. The bonding glass contains 55 to 70% by weight of $V_2O_5$, 17 to 25% by weight of $P_2O_5$, 3 to 20% by weight of $Sb_2O_3$, 0 to 20% by weight of PbO, 0 to 15% by weight of $Tl_2O$, and 0 to 5% by weight of $Nb_2O_5$.

14 Claims, 4 Drawing Sheets

MAGNETIC HEAD HAVING LAYERS OF AMORPHOUS MAGNETIC ALLOY BONDED TOGETHER WITH A GLASS CONTAINING VANDIUM OXIDE PHOSPHORUS OXIDE AND ANTIMONY OXIDE

BACKGROUND OF THE INVENTION

This invention relates to a magnetic head of amorphous magnetic alloy with a high performance and to a process for producing such a magnetic head.

In the conventional magnetic head, ferrite is used as a magnetic core material, and glass having a working temperature of 600° C. or higher has been so far used as an adhesive for bonding magnetic cores or forming a magnetic gap, because of its non-magnetism and matching to the coefficient of thermal expansion of ferrite and moreover because of the required weathering resistance, attrition resistance, strength, etc.

With the recent progress of high density recording, a magnetic head with a higher performance than that of the conventional magnetic head has been in demand. An amorphous magnetic alloy with a high saturation magnetic flux density and a high magnetic permeability has been regarded as a promising material for high performance magnetic heads [Japanese Patent Application Kokai (Laid-open) No. 59-180817]. In the case of magnetic cores of amorphous magnetic alloy, it has been impossible to bond the magnetic cores or form a magnetic gap at a higher temperature than the crystallization temperature of amorphous magnetic alloy, and their practical application has not been realized yet. The crystallization temperature of amorphous magnetic alloy whose saturation magnetic flux density is 8,000 G or higher is as high as about 550° C. The higher the saturation magnetic flux density, the better the recording characteristics, but the lower the crystallization temperature and the less the thermal stability. That is, the magnetic permeability is drastically lowered by crystallization, and the reproducing characteristics are lowered.

SUMMARY OF THE INVENTION

An object of the present invention is to provide a magnetic head of amorphous magnetic alloy with distinguished magnetic characteristics.

Another object of the present invention is to provide a magnetic head of amorphous magnetic alloy, where magnetic cores are bonded or a magnetic gap is formed with an adhesive incapable of lowering the magnetic properties of an amorphous magnetic alloy.

Other objects of the present invention will be apparent from the description which follows.

The present inventors have taken notice that the magnetic properties of an amorphous magnetic alloy is in a close relationship with its crystallization temperature and particularly depend upon the heating temperature for bonding magnetic cores of a magnetic head or forming a magnetic gap. Thus, the present inventors have studied by how much a lower temperature than the crystallization temperature would have no adverse effect upon the magnetic characteristics of a magnetic head, and have found that a temperature by at least 50° C. lower than the crystallization temperature has no problem. That is, the temperature by 50° C. lower than the crystallization temperature is an upper limit to the temperature giving no influence upon the magnetic characteristics. It is during the period of bonding cores or forming a magnetic gap in the production of a magnetic head that the magnetic head is susceptible to the heating giving a most considerable influence upon the magnetic characteristics. Thus, in the case of a magnetic head of amorphous magnetic alloy, it is necessary to use an adhesive capable of bonding at a temperature by at least 50° C. lower than the crystallization temperature of the amorphous magnetic alloy in the bonding of the magnetic cores or the formation of the magnetic gap.

Furthermore, it is also necessary that the magnetic head is rigid and highly durable, and what is important is that in the production of a magnetic head at least two magnetic cores are bonded together and then the bonded cores are cut to a necessary size. The cutting operation is generally slicing with a diamond cutter while spraying water, etc. onto the bonded cores, and thus it is necessary that the adhesive layer has a good water resistance. During the application of a magnetic head, it is also necessary that the adhesive layer undergoes no deterioration by water, moisture, etc. in the surrounding atmosphere.

The present invention is based on such a finding as a result of extensive studies of various adhesive materials that a glass containing $V_2O_5$ as the main component and also containing $P_2O_5$ and $Sb_2O_3$ provides a distinguished adhesive that can attain the object of the present invention.

The $V_2O_5$—$P_2O_5$—$Sb_2O_3$—based glass is suitable for bonding ferrite cores, because the working temperature is about 460° C., which is comparable to that of head borosilicate ($PbO$—$B_2O_3$—$SiO_2$—$Al_2O_3$)-based glass so far used in the conventional magnetic head [Japanese patent application Kokai (Laid-open) No. 59-146431]. Particularly, the coefficient of thermal expansion is as low as $75 \times 10^{-7}/°C$. It has been said that a $V_2O_5$—$P_2O_5$—based glass has a poor water resistance [Yogyo Kyokai-shi 90 (8), 415 (1982)] and is readily devitrified. However, the water resistance can be improved by adding $Sb_2O_3$ thereto. As is obvious from Table 3 which follows, the present glass containing 10% by weight of $Sb_2O_3$ has a water resistance about 20 times as high as that of the lead borosilicate-based glass.

Furthermore, the working temperature can be lowered to about 420° C. by adding at least one of PbO, $Tl_2O$, and $Nb_2O_5$ to the $V_2O_5$—$P_2O_5$—$Sb_2O_3$-based glass, and thus the present invention can provide a magnetic head of amorphous magnetic alloy with distinguished characteristics so far not realized.

A preferable composition range for the low melting glass containing $V_2O_5$ as the main component as an adhesive for the magnetic head of amorphous magnetic alloy is 55 to 70% by weight of $V_2O_5$, 17 to 25% by weight of $P_2O_5$, 3 to 20% by weight of $Sb_2O_3$, 0 to 20% by weight of PbO, 0 to 15% by weight of $Tl_2O$, and 0 to 5% by weight of $Nb_2O_5$, and a more preferable composition range is 55 to 65% by weight of $V_2O_5$, 18 to 22% by weight of $P_2O_5$, 5 to 12% by weight of $Sb_2O_3$, 3 to 10% by weight of PbO, 3 to 10% by weight of $Tl_2O$, and 0.5 to 2% by weight of $Nb_2O_5$.

As regards the softening point, a $PbO$—$V_2O_5$—$P_2O_5$-based glass has been proposed [Japanese patent application Kokai (Laid-open) No. 55-75937], and has a softening point as low as about 320° C. owing to a higher PbO content, but has a coefficient of thermal expansion as high as about $150 \times 10^{-7}/°C$. Furthermore, PbO attacks the amorphous alloy, and thus the $PbO$—$V_2O_5$—$P_2O_5$- based glass is not suitable as a bonding glass for the magnetic head.

In the present adhesive, the working temperature can be lowered by adding PbO thereto, but the amorphous alloy will be attacked with PbO when too much added. On the other hand, $Tl_2O$ can lower the working temperature without such a fear. $Nb_2O_5$ as added can effectively lower the coefficient of thermal expansion of sintered glass.

DETAILED DESCRIPTION OF PREFERRED EMBODIMENTS

Figure 1:
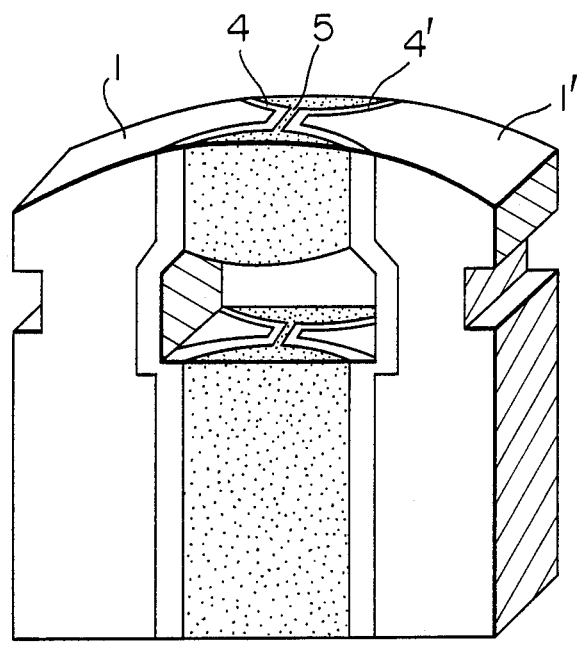
FIG. 1 is a perspective view showing one embodiment of a magnetic head of amorphous magnetic alloy according to the present invention.

The present invention will be described in detail below, referring to Examples.

The saturation magnetic flux density and the crystallization temperature of amorphous magnetic alloys used in Examples are shown in Table 1.

TABLE 1

| Amorphous magnetic alloy (atomic %) | Saturation magnetic flux density (G) | Crystallization temperature (°C.) |
|---|---|---|
| A $Co_{81}$—$Nb_{14}$—$Zr_5$ | 8000 | 550 |
| B $Co_{83}$—$Nb_{13}$—$Zr_4$ | 9000 | 530 |
| C $Co_{85.5}$—$Nb_{11.5}$—$Zr_3$ | 10000 | 500 |
| D $Co_{87}$—$Nb_{10}$—$Zr_3$ | 11000 | 480 |

As is obvious from Table 1, the higher the saturation magnetic flux density of amorphous magnetic alloy, the lower the crystallization temperature. Thus, bonding of magnetic cores and formation of magnetic gap must be carried out at a lower temperature. Even at a temperature lower than the crystallization temperature, crystallization may take place, if kept at that temperature for a long time. Thus, the present inventors have studied a temperature range in which the crystallization takes place no more even if kept at a given temperature. When an amorphous magnetic alloy starts to undergo crystallization, the magnetic permeability is drastically lowered. Thus, it is necessary to prevent occurrence of crystallization.

Before the crystallization of amorphous magnetic alloy is observed by X-ray diffraction or by an electron microscope, the amorphous magnetic alloy undergoes some structural change. Once the structural change occurs, crystallization of the amorphous magnetic alloy slowly proceeds. Detailed behavior from the structural change to the crystallization has not been clarified yet, but the temperature is a most dominant factor.

The present inventors have investigated the relationship between the crystallization and the crystallization-promoting temperature to find an allowable range for the heating temperature for producing a magnetic head of amorphous magnetic alloy.

TABLE 2

| Amorphous magnetic alloy | Heating temperature (°C.) | Difference from crystallization temperature (°C.) | Retention time (min.) | | |
|---|---|---|---|---|---|
| | | | 15 | 30 | 60 |
| A | 530 | 20 | x | x | x |
| | 520 | 30 | | x | x |
| | 510 | 40 | | | x |
| | 500 | 50 | | | |
| B | 500 | 30 | x | x | x |
| | 490 | 40 | | x | x |
| | 480 | 50 | | | |
| | 470 | 60 | | | |
| C | 470 | 30 | x | x | x |
| | 460 | 40 | | x | x |
| | 450 | 50 | | | x |
| | 440 | 60 | | | |
| D | 450 | 30 | x | x | x |
| | 440 | 40 | x | x | x |
| | 430 | 50 | | | x |
| | 420 | 60 | | | |

: not crystallized
x: crystallized

TABLE 3

| Glass No. | Low melting glass (wt %) | Working temperature (°C.) | Coefficient of thermal expansion ($10^{-7}$/°C.) | Water resistance (mg/g) | 4-point bending strength (Kgf/mm$^2$) | Microvickers hardness (100 gf-15 sec.) |
|---|---|---|---|---|---|---|
| Example | | | | | | |
| 1 | $V_2O_5$—$P_2O_5$—$Sb_2O_3$<br>60   25   15 | 460 | 75 | 0.7 | 5.6 | 360 |
| 2 | $V_2O_5$—$P_2O_5$—$Sb_2O_3$—PbO<br>60   20   10   10 | 444 | 93 | 0.3 | 5.0 | 339 |
| 3 | $V_2O_5$—$P_2O_5$—$Sb_2O_3$—$Tl_2O$<br>60   20   10   10 | 430 | 85 | 1.3 | 4.9 | 345 |
| 4 | $V_2O_5$—$P_2O_5$—$Sb_2O_3$—PbO—$Tl_2O$<br>60   20   10   5   5 | 420 | 86 | 0.3 | 4.8 | 342 |
| 5 | $V_2O_5$—$P_2O_5$—$Sb_2O_3$—PbO—$Nb_2O_5$<br>62   22   6   9   1 | 440 | 86 | 1.8 | 4.6 | 340 |
| 6 | $V_2O_5$—$P_2O_5$—$Sb_2O_3$—PbO—$Tl_2O$—$Nb_2O_5$<br>60   20   9   5   5   1 | 435 | 76 | 0.4 | 5.2 | 354 |
| Comp. Ex. | | | | | | |
| 7 | PbO—$B_2O_3$—$SiO_2$—$Al_2O_3$<br>82   12   3   3 | 487 | 108 | 20.1 | 3.8 | 297 |
| 8 | PbO—$B_2O_3$—$SiO_2$—$Al_2O_3$ | 460 | 118 | 13.5 | 3.6 | 273 |

TABLE 3-continued

| Glass No. | Low melting glass (wt %) | | | | Working temperature (°C.) | Coefficient of thermal expansion ($10^{-7}$/°C.) | Water resistance (mg/g) | 4-point bending strength (Kgf/mm$^2$) | Microvickers hardness (100 gf-15 sec.) |
|---|---|---|---|---|---|---|---|---|---|
| | 85 | 13 | 1 | 1 | | | | | |

Table 2 shows the relationship with the time till the crystallization when the amorphous magnetic alloy is kept at a temperature lower than the crystallization temperature, that is, the retention time, where the state of crystallization is determined by X-ray diffraction. It is obvious from Table 2 that the magnetic characteristics are not practically influenced, if the temperature is by at least 50° C. lower than the crystallization temperature of amorphous magnetic alloy.

Table 3 shows the compositions and characteristics of low melting glasses used in the bonding of magnetic cores and the formation of a magnetic gap, where No. 1–No. 6 glasses are low melting glasses containing $V_2O_5$ as the main component and No. 7 and No. 8 glasses are the conventional low melting glasses containing PbO as the main component, which are used as comparative examples. No. 8 glass is one of those workable particularly at a low temperature. The working temperature in Table 3 is a temperature at which the glass shows a viscosity of about $10^4$ poises. A viscosity of at least such a degree is necessary for the bonding of magnetic cores and the formation of a magnetic gap. The water resistance is a weight reduction (mg/g) of a glass piece in a 5×5×5 mm cube, when placed in 40 cc of distilled water and heated at 70° C. for 2 hours. The present glasses containing $V_2O_5$ as the main component have a higher water resistance than the conventional glasses containing PbO as the main component. Furthermore, the present glasses containing $V_2O_5$ as the main component have a lower coefficient of thermal expansion than the conventional glasses containing PbO.

Figure 2:
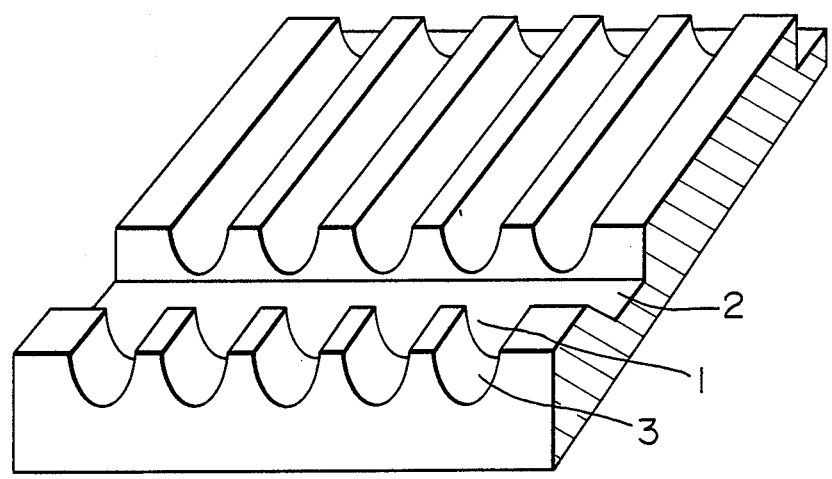
FIG. 2 is a perspective view of a core block substrate 1 for FIG. 1.

The magnetic heads shown in FIG. 1 are prepared from the amorphous magnetic alloys of Table 1 and the low melting glasses of Table 3 in the following manner. As shown in FIG. 2, a coil groove 2 and track grooves 3 are provided on a substrate 1 to form a magnetic gap surface. For the substrate, ferrite, non-magnetic ceramics or high melting glass is used. Then coefficient of thermal expansion is $80$–$100\times10^{-7}$/°C.

Figure 3:
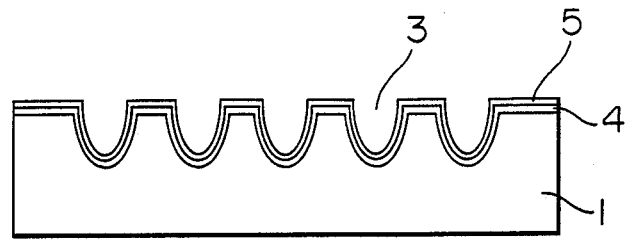
FIG. 3 is an upper side view of the core block with an amorphous magnetic alloy film 4 and a gap spacer 5.

Then, as shown in FIG. 3, an amporhous magnetic alloy film 4 is formed to a thickness of 25 μm on the magnetic gap surface by high frequency sputtering (which will be hereinafter referred to as "RF sputtering"), and then a $SiO_2$ layer 5 is formed to a thickness of 0.15 μm as a gap spacer thereon by RF sputtering to make the specified gap 0.30 μm distant.

Figure 4:
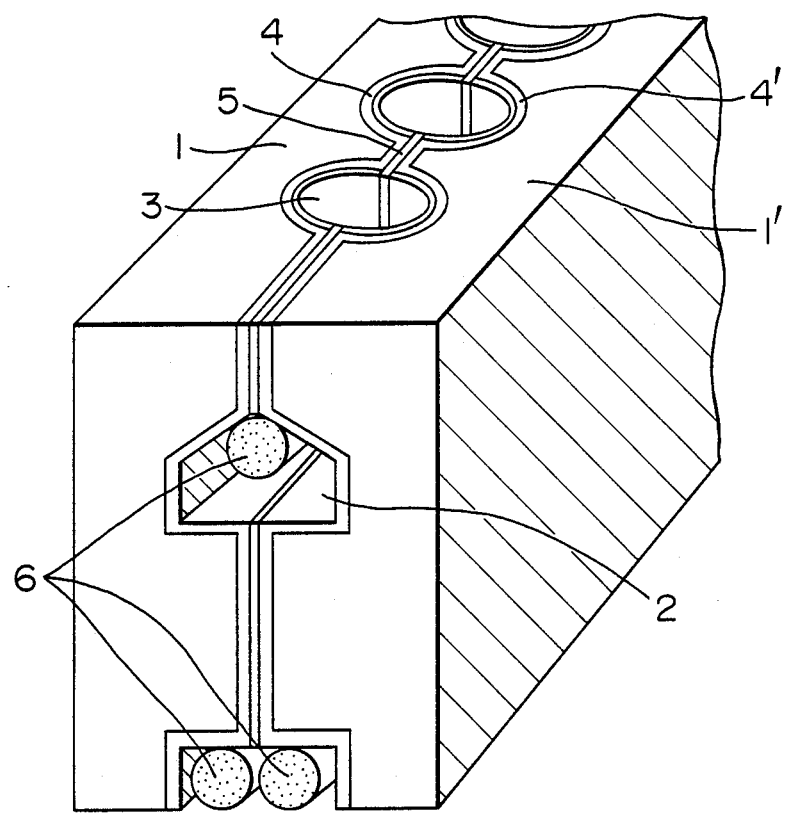
FIG. 4 is a perspective view of the core blocks in an abutted state.

Then, as shown in FIG. 4, the core blocks 1, 1' with the amorphous magnetic alloy film and the gap spacer are abutted together, and rods 6 composed of a low melting glass of Table 3 are provided and heated up to a temperature at which the glass viscosity reaches $10^4$ poises, and kept at that temperature for 25 minutes to bond the core blocks. Then, the bonded core blocks are ground, polished and cut to prepare a magnetic head shown in FIG. 1.

Example 1

Magnetic heads of FIG. 1 were prepared from $Co_{81}Nb_{14}Zr_5$ as an amporhous magnetic alloy, a high melting glass as a substrate and glasses of Table 3 as bonding glasses for core blocks. The coefficient of thermal expansion of the $ZnO$–$B_2O_3$–$SiO_2$–$BaO$-based substrate glass used was $80\times10^{-7}$/°C. The bonding temperature of core blocks, gap of magnetic heads thus prepared and production yield are shown in Table 4.

TABLE 4

| Glass No. | Bonding temp. (°C.) | Gap (μm) | Production yield (%) | Remarks |
|---|---|---|---|---|
| Example | | | | |
| 1 | 460 | 0.30 | 92 | Amorphous |
| 2 | 450 | 0.30 | 75 | magnetic |
| 3 | 430 | 0.30 | 87 | alloy not |
| 4 | 420 | 0.30 | 88 | crystallized |
| 5 | 440 | 0.30 | 83 | |
| 6 | 440 | 0.30 | 95 | |
| Comp. Ex. | | | | |
| 7 | 490 | 0.31–0.36 | 48 | Amorphous |
| 8 | 460 | 0.32–0.36 | 37 | magnetic alloy not crystallized |

The bonding temperature (working temperature) is a temperature at which the glass has a viscosity of about $10^4$ poises, as already mentioned before. Under the glass bonding conditions, the amorphous magnetic alloy was not crystallized, but in the case of No. 7 and No. 8 glasses containing PbO as the main component, the gap was extended, and was not uniform, and the production yield failed to reach 50%, excluding the peeled magnetic cores and those with cracked adhesive layers.

The cause for the extended gap and uneven gap was ready attacking of $SiO_2$ by the low melting glasses containing PbO as the main component and the resulting intrusion of the glasses into the gap part. The cause for the poor production yield was a large difference between the high melting glass as the substrate and the bonding glasses, and the resulting cracking in the bonding glass part or peeling of core blocks. In the case of No. 1–No. 6 glasses containing $V_2O_5$ as the main component, on the other hand, the gap had a specific distance and the production yield was high. The cause for a little lower production yield of No. 2 glass seemed to be a little higher coefficient of thermal expansion of the glass.

Example 2

Magnetic heads of FIG. 1 were prepared from $Co_{83}Nb_{13}Zr_4$ having a lower crystallization temperature than that of $Co_{81}Nb_{14}Zr_5$ as an amorphous magnetic alloy, monocrystalline (Mn—Zn) ferrite as a substrate, and glasses of Table 3 as a bonding glass. The coefficient of thermal expansion of monocrystalline ferrite used was $95\times10^{-7}$/°C. Bonding temperature of core blocks, gap of magnetic heads thus prepared and production yield are shown in Table 5. The bonding conditions were the same as in Example 1.

TABLE 5

| Glass No. | Bonding temp. (°C.) | Gap (μm) | Production yield (%) | Remarks |
|---|---|---|---|---|
| 1 | 460 | 0.30 | 93 | Amorphous magnetic alloy not crystallized |
| 2 | 450 | 0.30 | 80 | |
| 3 | 430 | 0.30 | 91 | |
| 4 | 420 | 0.30 | 93 | |
| 5 | 440 | 0.30 | 91 | |
| 6 | 440 | 0.30 | 96 | |
| 7 | 490 | 0.32–0.37 | 68 | Amorphous magnetic alloy crystallized |
| 8 | 460 | 0.31–0.36 | 50 | Amorphous magnetic alloy not crystallized |

Under the glass bonding conditions, no crystallization of other amorphous magnetic alloys than PbO-based No. 7 glass was observed.

In the magnetic head using No. 7 glass, the amorphous magnetic alloy was crystallized, and the desired characteristics as a magnetic head were not obtained.

In the case of No. 8 glass, the production yield was improved, as compared with that of Example 1, but it was found that the gap was extended and not uniform.

Example 3

Magnetic heads of FIG. 1 were prepared from $Co_{85.5}Nb_{11.5}Zr_3$ having a lower crystallization temperature than that of $Co_{83}Nb_{13}Zr_4$ as an amorphous magnetic alloy, a non-magnetic ceramic (2MgO.SiO: forsterite) having a coefficient of thermal expansion of $100 \times 10^{-7}/°C$. as a substrate, and glasses of Table 3 as a bonding glass for core blocks. Bonding temperature of core blocks, gap of magnetic heads thus prepared and production yield are shown in Table 6.

TABLE 6

| Glass No. | Bonding temp (°C.) | Gap (μm) | Production yield (%) | Remarks |
|---|---|---|---|---|
| 1 | 460 | 0.30 | 90 | Amorphous magnetic alloy crystallized |
| | 450 | 0.03 | 72 | Amorphous magnetic alloy not crystallized |
| 2 | 445 | 0.30 | 90 | |
| 3 | 430 | 0.30 | 92 | |
| 4 | 420 | 0.30 | 95 | |
| 5 | 440 | 0.30 | 92 | |
| 6 | 435 | 0.30 | 94 | |
| 7 | 450 | 0.30 | 30 | |
| 8 | 460 | 0.32–0.36 | 58 | Amorphous magnetic alloy crystallized |
| | 450 | 0.31–0.33 | 38 | Amorphous magnetic alloy not crystallized |

In the case of glasses having a high working temperature, the amorphous magnetic alloy was crystallized, and thus as to No. 1, No. 7 and No. 8 glasses having a high working temperature magnetic heads were prepared at a temperature by about 50° C. lower than the crystallization temperature of the amorphous magnetic alloy. As a result, it was found that no strong bonding was obtained, and the production yield was also extremely lowered.

In the case of No. 2–No. 6 glasses containing $V_2O_5$ as the main component, magnetic heads could be prepared owing to the thoroughly low working temperature without any crystallization of the amorphous magnetic alloy, where the production yield was very high, for example, 90% or higher, and the gap was obtained uniformly as specified. The magnetic heads had a strongly bonded magnetic gap.

Example 4

Magnetic heads of FIG. 1 were prepared from $Co_{87}Nb_{10}Zr_3$ having a lower crystallization temperature and the highest saturation magnetic flux density in Table 1 as an amorphous magnetic alloy, a $BaTiO_3$-based non-magnetic ceramics having a coefficient of thermal expansion of $90 \times 10^{-7}/°C$. as a substrate, and No. 2–No. 6 glasses of Table 3 as a bonding glass for core blocks.

No. 1, No. 7 and No. 8 glasses of Table 3 were not used owing to their too high working temperatures for the amorphous magnetic alloy of $Co_{87}Nb_{10}Zr_3$. In Table 7, bonding temperature of core blocks with No. 2–No. 6 glasses, gap of the thus prepared magnetic heads and production yield are shown.

TABLE 7

| Glass No. | Bonding temp. (°C.) | Gap (μm) | Production yield (%) | Remarks |
|---|---|---|---|---|
| 2 | 445 | 0.30 | 82 | Amorphous magnetic alloy crystallized |
| 3 | 430 | 0.30 | 93 | Amorphous magnetic alloy not crystallized |
| 4 | 420 | 0.30 | 94 | |
| 5 | 440 | 0.30 | 91 | Amorphous magnetic alloy crystallized |
| 6 | 430 | 0.30 | 90 | Amorphous magnetic alloy not crystallized |

In the case of No. 2 and No. 5 glasses, the amorphous magnetic alloy was crystallized, and could not be used for a magnetic head, whereas in the case of No. 3, No. 4 and No. 6 glasses, magnetic heads could be prepared with a higher production yield than 90% and a specified gap without crystallization of the amorphous magnetic alloy.

Figure 5:
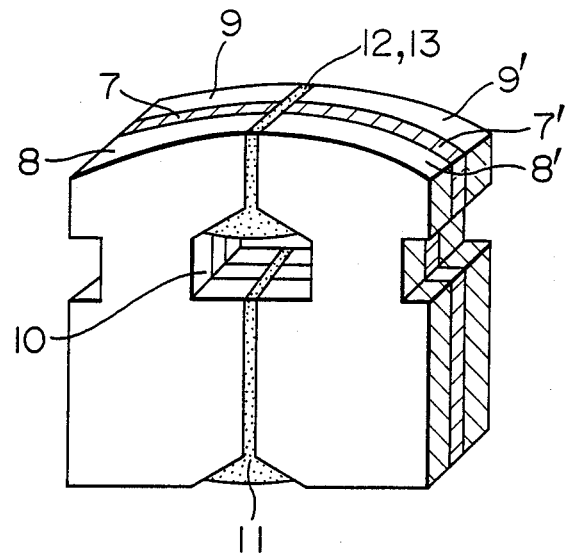
FIG. 5 is a perspective view showing another embodiment of a magnetic head of amorphous magnetic alloy according to the present invention.
Figure 6:
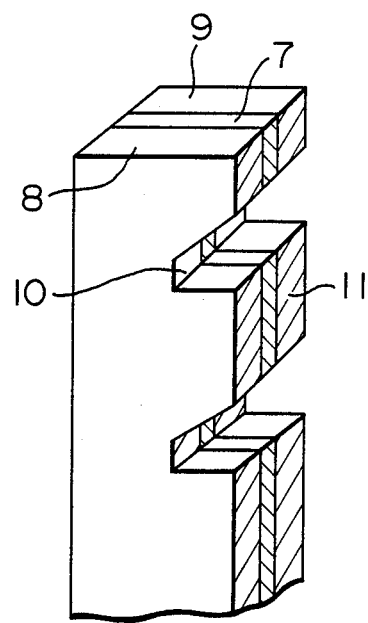
FIG. 6 is a perspective view of a core block for FIG. 5.

The magnetic heads shown in FIG. 5 are prepared in the following manner. As shown in FIG. 6, an amorphous magnetic alloy film 7 is sandwiched between non-magnetic reinforcing members 8, 9 to form a core block in a sandwich structure. After provision of coil grooves 10, the magnetic gap surfaces 11 are polished. For the reinforcing members 8, 9, a non-magnetic ceramics or high melting glass is used.

Figure 7:
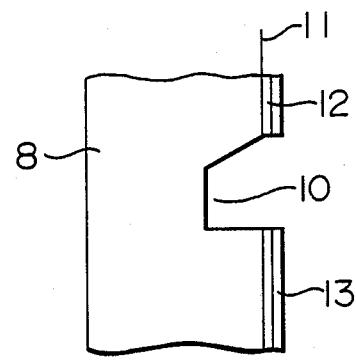
FIG. 7 is a side view of the core block with a gap spacer.

Then, gap spacer corresponding to a gap is formed on the magnetic gap surface 11 so as to make a gap 0.26 μm distant by forming a $SiO_2$ layer at first to a thickness of 0.10 μm on the magnetic gap surface 11 by RF sputtering and then a low melting glass layer 13 of Table 3 to a thickness of 0.03 μm thereon by RF sputtering, as shown in FIG. 7.

Figure 8:
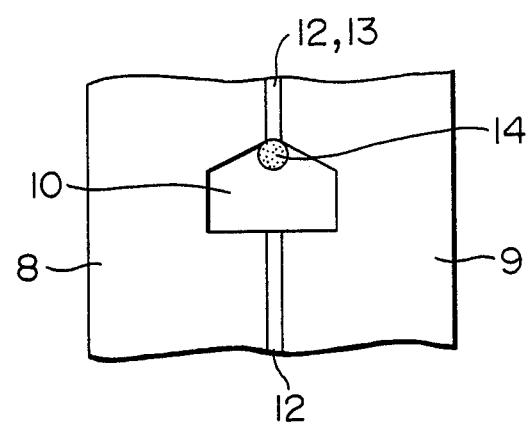
FIG. 8 is a side view of the core blocks in an abutted state.

Then, the thus prepared core blocks are abutted together, as shown in FIG. 8, and a glass rod 14 having the same composition as that of the glass layer 13 is provided in the core groove 10 and heated to a temperature at which the glass has a viscosity of about $10^5$ poises and kept at that temperature for 18 minutes to bond the core blocks together. Then, the bonded blocks are ground, polished and cut to prepare a magnetic head shown in FIG. 5.

In bonding core blocks, it is not necessary to fill a low melting glass even into the track groove exactly as in the magnetic head shown in FIG. 1, and thus a glass viscosity of about $10^5$ poises is satisfactory. The magnetic head of FIG. 5 has such an advantage as workable at a lower temperature than in the case of the magnetic head shown in FIG. 1.

Example 5

Magnetic heads of FIG. 5 were prepared from $Co_{83}Nb_{13}Zr_4$ as an amorphous magnetic alloy, a $SiO_2$—PbO—$K_2O$—ZnO-based high melting glass having a coefficient of thermal expansion of $90 \times 10^{-7}/°C$. as a reinforcing member, and glasses of Table 3 as a bonding glass for core blocks. Bonding temperature of core blocks, gap of the thus prepared magnetic heads and production yield are shown in Table 8.

TABLE 8

| Glass No. | Bonding temp. (°C.) | Gap (μm) | Production yield (%) | Remarks |
|---|---|---|---|---|
| 1 | 440 | 0.26 | 94 | Amorphous magnetic alloy not crystallized |
| 2 | 420 | 0.26 | 85 | |
| 3 | 410 | 0.26 | 91 | |
| 4 | 405 | 0.26 | 95 | |
| 5 | 420 | 0.26 | 92 | |
| 6 | 415 | 0.26 | 96 | |
| 7 | 460 | 0.26 | 65 | |
| 8 | 440 | 0.26 | 52 | |

Under the glass bonding conditions the amorphous magnetic alloy was not crystallized. In the case of No. 7 and No. 8 glasses containing PbO as the main component, the gap extension and the uniformity were obtained as specified, as in the magnetic head shown in FIG. 1, but the production yield was low and no strongly bonded magnetic gap was obtained, because it seems that the attack of the magnetic gap part of glass containing PbO as the main component by $SiO_2$ was weak owing to such a lower temperature than the working temperature that the glass viscosity was $10^5$ poises.

In the case of No. 1-No. 6 glasses containing $V_2O_5$ as the main component, on the other hand, the gap was obtained as specified with high production yields, particularly higher than 90% with respect to No. 3-No. 6 glasses. Furthermore, strongly bonded magnetic gaps were obtained.

Example 6

Magnetic heads of FIG. 5 were prepared from $Co_{87}Nb_{10}Zr_3$ as an amorphous magnetic alloy, a $CaTiO_3$-based non-magnetic ceramics having a coefficient of thermal expansion of $100 \times 10^{-7}/°C$. as a substrate, and No. 2-No. 6 and No. 8 glasses of Table 2 as a low melting glass for bonding core blocks. No. 1 and No. 7 glasses of Table 2 had too high a bonding temperature for the amorphous magnetic alloy of $Co_{87}Nb_{10}Zr_3$. Bonding temperature for core blocks using the glasses, gap of the thus prepared magnetic head, and production yield are shown in Table 9.

TABLE 9

| Glass No. | Bonding temp. (°C.) | Gap (μm) | Production yield (%) | Remarks |
|---|---|---|---|---|
| 2 | 420 | 0.26 | 90 | Amorphous magnetic alloy not crystallized |
| 3 | 410 | 0.26 | 92 | |
| 4 | 405 | 0.26 | 95 | |
| 5 | 420 | 0.26 | 91 | |
| 6 | 415 | 0.26 | 92 | |
| 8 | 435 | 0.26 | 50 | Amorphous magnetic alloy crystallized |

From the glasses, the specified gap was obtained, but in the case of No. 8 glass containing PbO as the main component the amorphous magnetic alloy was crystallized, and the resulting magnetic head was not practically applicable. In the case of No. 2-No. 6 glasses, core blocks could be strongly bonded together without crystallization of the amorphous magnetic alloy, and the magnetic head could be prepared with high yields of 90% or more.

Example 7

An amorphous magnetic alloy film was formed on the same magnetic core blocks as in Example 5 in the same manner as in Example 5, and then a 10% solution of a polyimide-based resin Ultem (trademark of a product made by General Electric, USA) in dimethylformamide was spin coated thereon in place of the $SiO_2$ spacer of Example 5, and predried at 250° C. for 30 minutes to remove the solvent therefrom. Then, the core blocks were abutted together, and heated at 300° C. for 30 minutes to bond them together.

After the bonding, the bonded core blocks were cut to prepare a magnetic head of amorphous magnetic alloy. The thus prepared head had a strongly bonded magnetic gap, and had no crystallization at all because of the low heating temperature. The polyimide-based resin had a high bonding force and thus was very advantageous for bonding such a thin layer.

The present invention can provide a magnetic head of amorphous magnetic alloy with a high performance based on strongly bonded magnetic cores and a precise magnetic gap without lowering the characteristics of amorphous magnetic alloy.

What is claimed is:

1. A magnetic head which comprises a pair of magnetic cores each core comprising a non-magnetic substrate having an amorphous magnetic alloy layer on said substrate, counterposed to each other through a small magnetic gap and bonded to each other by fusion of a glass at a bonding temperature lower than the crystallization temperature of the amorphous magnetic alloy layers, the glass comprising vanadium oxide as a major component and phosphorus oxide and antimony oxide as minor components and, having a viscosity of not more than $10^5$ poises at the bonding temperature; said bonding temperature being at least 50° C. lower than the crystallization temperature of the amorphous magnetic alloy layer.

2. A magnetic head which comprises a pair of magnetic cores each core comprising a non-magnetic substrate having an amorphous magnetic alloy layer on said substrate, counterposed to each other through a small magnetic gap and bonded to each other by fusion of a glass at a bonding temperature lower than the crystallization temperature of the amorphous magnetic alloy layers, the glass comprising 55 to 70% by weight of $V_2O_5$, 17 to 25% of $P_2O_5$, 3 to 20% by weight of $Sb_2O_3$, 0 to 20% by weight of PbO, 0 to 15% by weight of $Tl_2O$ and 0 to 5% by weight of $Nb_2O_5$ in terms of oxides; said bonding temperature being at least 50° C. lower than the crystallization temperature of the amorphous magnetic alloy.

3. A magnetic head which comprises a pair of magnetic cores each core comprising a non-magnetic substrate having an amorphous magnetic layer on said substrate, counterposed to each other through a small magnetic gap and bonded to each other by fusion of a glass at a bonding temperature lower than the crystallization temperature of the amorphous magnetic alloy layers, the glass comprising 55 to 65% by weight of $V_2O_5$, 18 to 22% of $P_2O_5$, 5 to 12% by weight of $Sb_2O_3$, 3 to 10% by weight of PbO, 0 to 15% by weight of $Tl_2O$ and 0 to 5% by weight of $Nb_2O_5$ in terms of oxides; the bonding temperature being at least 50° C. lower than the crystallization temperature of the amorphous magnetic alloy layer.

4. A magnetic head of amorphous magnetic alloy according to claim 1, wherein the amorphous magnetic alloy comprises an alloy of Co—Nb—Zr as main components.

5. A magnetic head which comprises a pair of magnetic cores each core comprising a non-magnetic substrate having an amorphous magnetic alloy layer on said substrate, counterposed to each other through a small magnetic gap and bonded to each other by fusion of a glass at a bonding temperature lower than the crystallization temperature of the amorphous magnetic alloy layers, the glass comprising 55 to 65% by weight of $V_2O_5$, 18 to 22% of $P_2O_5$, 5 to 12% by weight of $Sb_2O_3$, 3 to 10% by weight of PbO, 3 to 10% by weight of $Tl_2O$ and 0.5 to 2% by weight of $Nb_2O_5$ and having a coefficient of thermal expansion of $(70 \text{ to } 100) \times 10^{-7}/°C$.; the bonding temperature being at least 50° C. lower than the crystallization temperature of the amorphous magnetic alloy layer.

6. A magnetic head which comprises a pair of magnetic cores each core comprising a non-magnetic substrate counterposed to each other, an amorphous magnetic alloy layer being provided on each of the counterposed surfaces of said substrates, a non-magnetic layer being formed on each of the amorphous magnetic alloy layers on the counterposed surfaces of said substrates to serve as a small magnetic gap of desired thickness, both the magnetic cores being bonded to each other by fusion of a glass at a bonding temperature lower than the crystallization temperature of the amorphous magnetic alloy layers, the glass comprising vanadium oxide as a major component and phosphorus oxide and antimony oxide as minor components and having a viscosity of not more than $10^5$ poises at the bonding temperature.

7. A magnetic head which comprises a pair of magnetic cores each core comprising or non-magnetic substrate counterposed to each other, an amorphous alloy layer being provided on each of the counterposed surfaces of said substrates, a non-magnetic layer being formed on each of the amorphous magnetic alloy layers on the counterposed surfaces of said substrates to serve as a small magnetic gap of desired thickness, both the magnetic cores being bonded to each other by fusion of a glass comprising 55 to 70% by weight of $V_2O_5$, 17 to 25% of $P_2O_5$, 3 to 20% by weight of $Sb_2O_3$, 0 to 20% by weight of PbO, 0 to 15% by weight of $Tl_2O$ and 0 to 5% by weight of $Nb_2O_5$ in terms of oxides.

8. A magnetic head which comprises a pair of magnetic cores each core comprising a non-magnetic substrate counterposed to each other, an amorphous magnetic alloy layer being provided on each of the counterposed surfaces of said substrates, a non-magnetic layer being formed on each of the amorphous magnetic alloy layers on the counterposed surfaces of said substrates to serve as a small magnetic gap of desired thickness, both the magnetic cores being bonded to each other by fusion of a glass at a bonding temperature lower than the crystallization temperature of the amorphous magnetic alloy layers, the glass comprising 55 to 65% by weight of $V_2O_5$, 18 to 22% of $P_2O_5$, 5 to 12% by weight of $Sb_2O_3$, 3 to 10% by weight of PbO, 3 to 10% by weight of $Tl_2O$ and 0.5 to 2% by weight of $Nb_2O_5$ in terms of oxides.

9. A magnetic head which comprises a pair of magnetic cores counterposed to each other each core comprising a non-magnetic substrate, an amorphous magnetic alloy layer being provided on each of the counterposed surfaces of said substrates, a non-magnetic layer being formed on each of the amorphous magnetic alloy layers on the counterposed surfaces of said substrates to serve as a small magnetic gap of desired thickness, both the magnetic cores being bonded to each other by fusion of a glass at a bonding temperature lower than the crystallization temperature of the amorphous magnetic alloy layers, the glass comprising 55 to 65% by weight of $V_2O_5$, 18 to 22% of $P_2O_5$, 5 to 12% by weight of $Sb_2O_3$, 3 to 10% by weight of PbO, 3 to 10% by weight of $Tl_2O$ and 0.5 to 2% by weight of $Nb_2O_5$ and having a coefficient of thermal expansion of $(70 \text{ to } 100) \times 10^{-7}/°C$.

10. A magnetic head which comprises a pair of magnetic cores arranged counterposed to each other through a small magnetic gap, an amorphous magnetic alloy layer located between non-magnetic elements forming each of the pair of the magnetic cores, the magnetic cores being bonded to each other by fusion of a glass at bonding temperature lower than the crystallization temperature of the amorphous magnetic alloy layer, the glass comprising vanadium oxide as a major component and phosphorus oxide and antimony oxide as minor components and having a viscosity of not more than $10^5$ poises at the bonding temperature.

11. A magnetic head which comprises a pair of magnetic cores arranged counterposed to each other through a small magnetic gap, an amorphous magnetic alloy layer located between non-magnetic elements forming each of the pair of the magnetic cores, the magnetic cores being bonded to each other by fusion of a glass at a bonding temperature lower than the crystallization temperature of the amorphous magnetic alloy layer, the glass comprising 55 to 70% by weight of $V_2O_5$, 17 to 25% of $P_2O_5$, 3 to 20% by weight of $Sb_2O_3$, 0 to 20% by weight of PbO, 0 to 15% by weight of $Tl_2O$ and 0 to 5% by weight of $Nb_2O_5$ in terms of oxides.

12. A magnetic head which comprises a pair of magnetic cores arranged counterposed to each other through a small magnetic gap, an amorphous magnetic alloy layer located between non-magnetic elements forming each of the pair of the magnetic cores, the magnetic cores being bonded to each other by fusion of a glass at bonding temperature lower than the crystallization temperature of the amorphous magnetic alloy layer, the glass comprising 55 to 65% by weight of $V_2O_5$, 18 to 22% of $P_2O_5$, 5 to 12% by weight of $Sb_2O_3$, 3 to 10% by weight of PbO, 3 to 10% by weight of $Tl_2O$ and 0.5 to 2% by weight of $Nb_2O_5$ in terms of oxides.

13. A magnetic head which comprises a pair of magnetic cores arranged counterposed to each other through a small magnetic gap, an amorphous magnetic alloy layer located between non-magnetic elements forming each of the pair of the magnetic cores, the magnetic cores being bonded to each other by fusion of a glass at a bonding temperature lower than the crystallization temperature of the amorphous magnetic alloy layer, the glass comprising 55 to 65% by weight of $V_2O_5$, 18 to 22% of $P_2O_5$, 5 to 12% by weight of $Sb_2O_3$, 3 to 10% by weight of PbO, 3 to 10% by weight of $Tl_2O$ and 0.5 to 2% by weight of $Nb_2O_5$ and having a coefficient of thermal expansion of $(70 \text{ to } 100) \times 10^{-7}/°C$.

14. A magnetic head which comprises a pair of magnetic cores each having an amorphous magnetic alloy layer on the core surface, arranged counterposed to each other through a small magnetic gap and bonded to each other by fusion of a glass at a bonding temperature lower than the crystallization temperature of the amorphous magnetic alloy layers, the glass having a viscosity of not more than $10^5$ poises at the bonding temperature, a water resistance in terms of weight reduction not more than 1.8 mg per gram when 5 mm cube of the glass is dipped in distilled water at 70° C. for 2 hours, a 4-point bending strength of not less than 4.6 Kgf/mm$^2$, a Microvickers hardness of not less than 339 and a coefficient of thermal expansion of $(70 \text{ to } 100) \times 10^{-7}/°C$.

* * * * *